United States Patent
Sartori et al.

(10) Patent No.: US 9,992,779 B2
(45) Date of Patent: *Jun. 5, 2018

(54) SYSTEM AND METHOD FOR RESOURCE ALLOCATION DEVICE-TO-DEVICE FOR OPEN DISCOVERY

(71) Applicant: Futurewei Technologies, Inc., Plano, TX (US)

(72) Inventors: Philippe Sartori, Plainfield, IL (US); Hossein Bagheri, Urbana, IL (US); Mazin Ali Al-Shalash, Frisco, TX (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/387,108

(22) Filed: Dec. 21, 2016

(65) Prior Publication Data

US 2017/0105225 A1 Apr. 13, 2017

Related U.S. Application Data

(63) Continuation of application No. 14/453,985, filed on Aug. 7, 2014, now Pat. No. 9,532,361.

(60) Provisional application No. 61/864,487, filed on Aug. 9, 2013.

(51) Int. Cl.
| | |
|---|---|
| *H04W 72/08* | (2009.01) |
| *H04W 72/04* | (2009.01) |
| *H04W 8/00* | (2009.01) |
| *H04W 24/10* | (2009.01) |

(52) U.S. Cl.
CPC ......... *H04W 72/085* (2013.01); *H04W 8/005* (2013.01); *H04W 24/10* (2013.01); *H04W 72/0446* (2013.01)

(58) Field of Classification Search
CPC ............. H04W 72/0493; H04W 8/005; H04W 72/0446; H04L 5/0048; H04L 5/0091; H04L 5/0066
See application file for complete search history.

(56) References Cited

U.S. PATENT DOCUMENTS

| | | | |
|---|---|---|---|
| 9,532,361 B2 * | 12/2016 | Sartori | ................. H04W 8/005 |
| 2010/0240312 A1 | 9/2010 | Peng et al. | |
| 2011/0268101 A1 | 11/2011 | Wang et al. | |
| 2012/0057475 A1 | 3/2012 | Wu et al. | |

(Continued)

FOREIGN PATENT DOCUMENTS

WO    2013088398    6/2013

OTHER PUBLICATIONS

"3rd Generation Partnership Project; Technical Specification Group Services and System Aspects; Feasibility study for Proximity Services (ProSe) (Release 12)," 3GPP TR 22.803 V12.0.0, Technical Report, Dec. 2012, 40 pages.

*Primary Examiner* — Kenneth Lam
(74) *Attorney, Agent, or Firm* — Slater Matsil, LLP (57) ABSTRACT

A method for operating a mobile device adapted for device-to-device (D2D) communications includes determining a utilization measure for discovery resources (DRs) allocated for D2D discovery in a communications system, and sending a utilization measure report to an evolved NodeB (eNB) when a reporting criterion is satisfied, wherein the utilization measure report is configured to prompt an adjustment to a number of DRs allocated for D2D discovery when an adjustment condition is met.

30 Claims, 6 Drawing Sheets

(56) References Cited

U.S. PATENT DOCUMENTS

| | | |
|---|---|---|
| 2012/0059935 A1 | 3/2012 | Patil et al. |
| 2012/0124231 A9 | 5/2012 | Richardson et al. |
| 2013/0010618 A1 | 1/2013 | Wang et al. |
| 2013/0016666 A1 | 1/2013 | Chen et al. |
| 2013/0114526 A1 | 5/2013 | Ahn et al. |
| 2013/0229934 A1 | 9/2013 | Brisebois et al. |
| 2014/0177456 A1 | 6/2014 | Boudreau et al. |
| 2014/0192680 A1 | 7/2014 | Hsu et al. |
| 2014/0204898 A1 | 7/2014 | Yang et al. |
| 2014/0219095 A1 | 8/2014 | Lim et al. |
| 2015/0009910 A1 | 1/2015 | Ryu et al. |
| 2015/0030015 A1 | 1/2015 | Chu |
| 2015/0056220 A1 | 2/2015 | Chennamsetty et al. |
| 2015/0078466 A1 | 3/2015 | Zhou et al. |
| 2015/0133102 A1 | 5/2015 | Sorrentino |
| 2015/0133132 A1 | 5/2015 | Li et al. |
| 2015/0264551 A1 | 9/2015 | Ko et al. |

\* cited by examiner

SYSTEM AND METHOD FOR RESOURCE ALLOCATION DEVICE-TO-DEVICE FOR OPEN DISCOVERY

CROSS-REFERENCE TO RELATED APPLICATIONS

This application is a continuation of U.S. patent application Ser. No. 14/453,985, filed on Aug. 7, 2014, entitled "System and Method for Resource Allocation Device-to-Device for Open Discovery," which claims the benefit of U.S. Provisional Application No. 61/864,487, filed on Aug. 9, 2013, entitled "Estimating UE Density for Device-to-Device (D2D) Resource Allocation," both of which applications are hereby incorporated herein by reference.

TECHNICAL FIELD

The present disclosure relates generally to digital communications, and more particularly to a system and method for resource allocation device-to-device (D2D) for open discovery.

BACKGROUND

Device-to-Device (D2D) technology is getting a lot of attraction because of the ability to offer new services, improve system throughput, and the like. Next generation wireless communication protocols are likely to implement D2D communication modes, where mobile stations communicate directly with one another rather than relaying wireless signals through an intermediate cellular infrastructure, e.g., cell towers, and the like. D2D communication may have a variety of practical advantageous, such as extending the coverage area of a cell or wireless local area network.

SUMMARY

Example embodiments of the present disclosure which provide a system and method for resource allocation device-to-device (D2D) for open discovery.

In accordance with an example embodiment of the present disclosure, a method for operating a mobile device adapted for device-to-device (D2D) operation is provided. The method includes determining, by the mobile device, a utilization measure for discovery resources (DRs) allocated for D2D discovery in a communications system, and sending, by the mobile device, a utilization measure report to an evolved NodeB (eNB) when a reporting criterion is satisfied, wherein the utilization measure report is configured to prompt an adjustment to a number of DRs allocated for D2D discovery when an adjustment condition is met.

In accordance with another example embodiment of the present disclosure, a method for operating an evolved NodeB (eNB) is provided. The method includes receiving, by the eNB, a utilization report from a mobile device, the utilization report corresponding to a utilization measure for discovery resources (DRs) allocated for device-to-device (D2D) discovery in a communications system, and adjusting, by the eNB, a number of DRs allocated for D2D discovery in accordance with the utilization report.

In accordance with another example embodiment of the present disclosure, a mobile device adapted for device-to-device (D2D) communications is provided. The mobile device includes a processor, and a transmitter operatively coupled to the transmitter. The processor determines a utilization measure for discovery resources (DRs) allocated for D2D discovery in a communications system. The processor sends a utilization measure report to an evolved NodeB (eNB) when a reporting criterion is satisfied, where the utilization measure report is configured to prompt an adjustment to a number of DRs allocated for D2D discovery when an adjustment condition is met.

In accordance with another example embodiment of the present disclosure, an evolved NodeB (eNB) is provided. The eNB includes a receiver, and a processor operatively coupled to the receiver. The receiver receives a utilization report from a mobile device, the utilization report corresponding to a utilization measure for discovery resources (DRs) allocated for device-to-device (D2D) discovery in a communications system. The processor adjusts a number of DRs allocated for D2D discovery in accordance with the utilization report.

One advantage of an embodiment is that the number of resources allocated for D2D discovery is adjusted in accordance with utilization of the resources. Therefore, resources may be freed up for cellular communications in light use situations, while additional resources may be allocated to support D2D discovery in heavy use situations.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to resource allocation device-to-device (D2D) for open discovery. For example, a mobile device determines a utilization measure for discovery resources (DRs) allocated for D2D discovery in a communications system, and sends a utilization measure report to an evolved NodeB (eNB) when a reporting criterion is satisfied, wherein the utilization measure report is configured to prompt an adjustment to a number of DRs allocated for D2D discovery when an adjustment condition is met.

The present disclosure will be described with respect to example embodiments in a specific context, namely communications systems that support D2D communications and open discovery. The disclosure may be applied to standards compliant communications systems, such as those that are compliant with Third Generation Partnership Project (3GPP), IEEE 802.11, and the like, technical standards, and non-standards compliant communications systems, that support D2D communications and open discovery.

Figure 1:
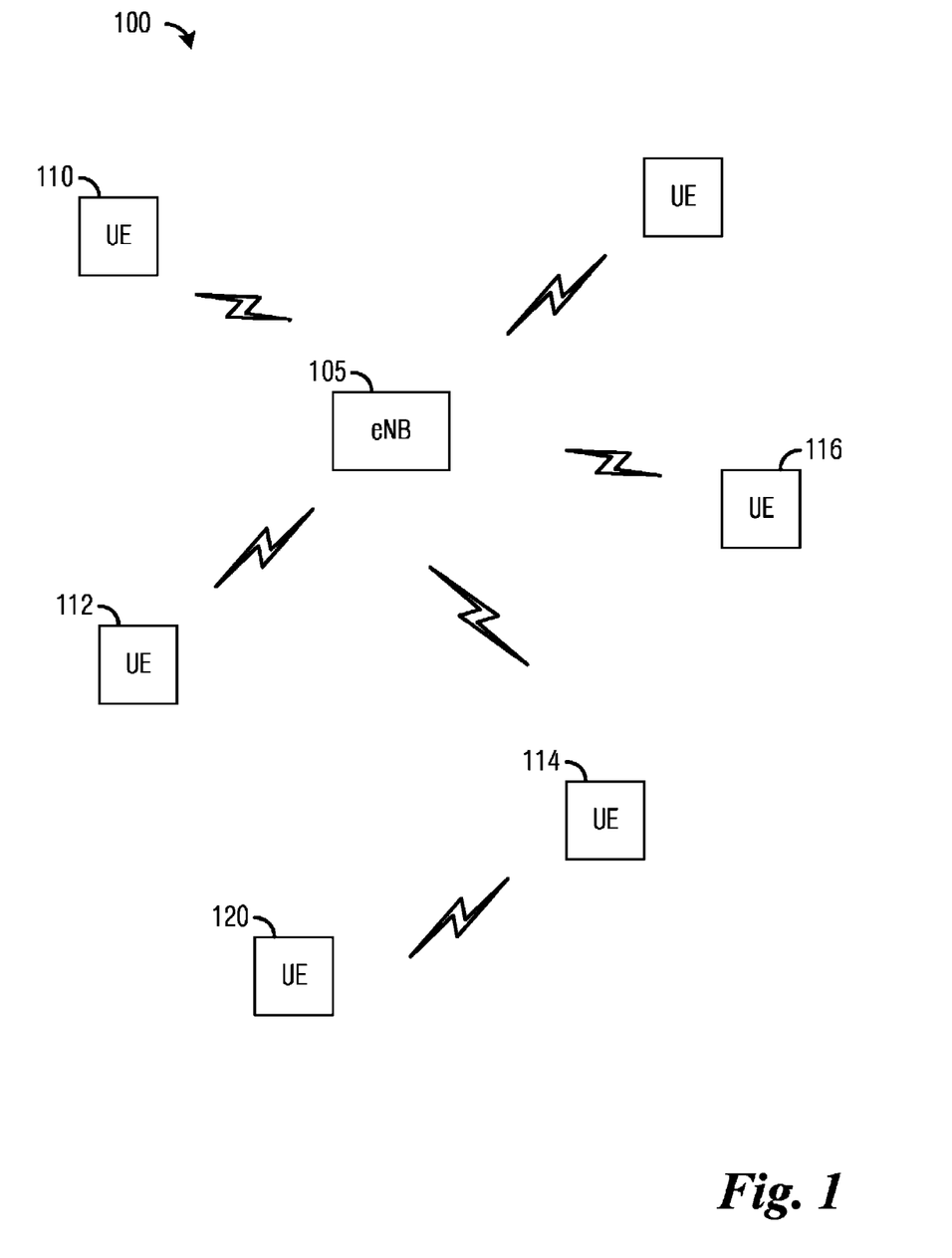
FIG. 1 illustrates an example communications system according to example embodiments described herein.

FIG. 1 illustrates an example communications system 100. Communications system 100 includes an evolved NodeB (eNB) 105 serving a plurality of user equipments (UEs), such as UE 110, UE 112, UE 114, and UE 116. eNB 105 is serving the plurality of UEs by receiving transmission intended for a UE and then forwarding the transmitting to the UE or receiving a transmission from a UE and then forwarding the transmission to its intended destination. In such a communications mode, eNB 105 and the plurality of UEs are said to be operating in a cellular mode. eNBs may also be commonly referred to as NodeBs, access points, base stations, controllers, communications controllers, and the like, while UEs may also be commonly referred to as mobile devices, mobiles, mobile stations, terminals, users, subscribers, stations, and the like.

D2D communications is a different operating mode where UEs can directly transmit to one another without having their transmissions being relayed by an eNB. As shown in FIG. 1, UE 114 is communicating directly with UE 120. UE 114 may be capable of communicating in the cellular mode, as well as in the D2D mode. UE 120 is operating in a D2D mode, but it may also be possible that UE 120 is capable of operating in the cellular mode with eNB 105. However, such operation is not shown in FIG. 1.

While it is understood that communications systems may employ multiple eNBs capable of communicating with a number of UEs, only one eNB, and a number of UEs are illustrated for simplicity.

In general, discovery is a process wherein a device can find other devices or be found by other devices. Through the discovery process, the device can find other devices with which to communicate. eNB assisted discovery is one form of discovery. In eNB assisted discovery, a UE is directed to transmit a signal (e.g., a sounding reference signal (SRS) signal) and another UE listens and reports the signal quality to the eNB. The eNB may, based on the signal quality report, determine if D2D communications (for example) can be enabled to the two UEs.

Open discovery is another form of discovery. In open discovery, UEs attempt to discover and be discovered by other UEs without being probed. Therefore, open discovery may be performed with limited facilitation by eNBs. According to an example embodiment, the eNB allocates communications system resources for the purpose of open discovery. The communications system resources allocated for open discovery may generally consist of uplink (UL) subframes, however, other communications system resources may be used. With open discovery, any UE can transmit a "beacon" signal, which may be referred to as a discovery signal, in one or more allocated communications system resources to advertise its presence to other UEs. In addition to transmitting discovery signals in communications system resources allocated for discovery, example embodiments disclose the use of discovery sequences that exploit time hopping to significantly improve the performance of discovery. Example embodiments also disclose systems and methods to determine communications system resources in which to transmit the discovery signals.

Generally, D2D communication may occur over any network bandwidth. In some example embodiments, D2D communication occurs on a UL portion of the network bandwidth in order to reduce the interference experienced by nearby UEs. More specifically, D2D transmissions on UL resources interfere with the eNB. As long as the D2D UE is a reasonable distance from the eNB, the interference created by the D2D UE has little impact on the eNB. Conversely, on DL portions of the network bandwidth, D2D transmissions affect neighboring UEs, and potentially, their ability to receive synchronization channels and physical downlink control channel (PDCCH) is affected, which may have a significantly higher negative impact than if the D2D UEs were transmitting on the UL.

Figure 2:
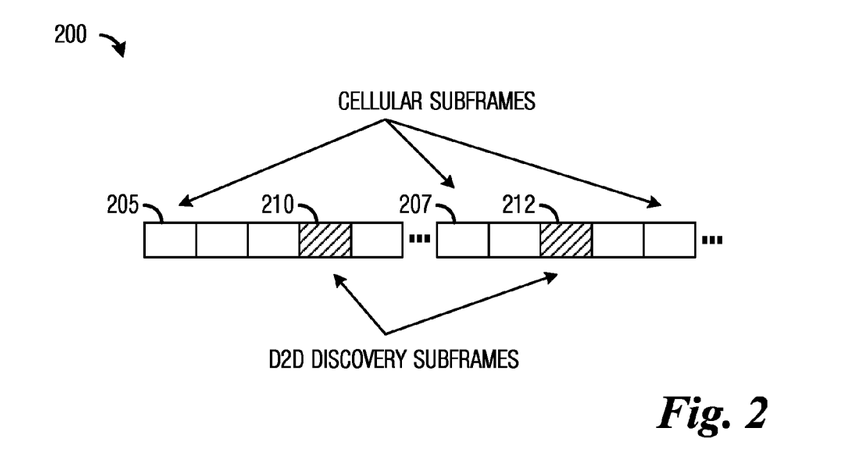
FIG. 2 illustrates an example subframes supporting D2D open discovery according to example embodiments described herein.

FIG. 2 illustrates an example subframes 200 supporting D2D open discovery. Subframe 200 includes cellular subframes (such as subframes 205 and 207) and D2D discovery subframes (such as D2D discovery subframe 210 and 212). The D2D discovery subframes comprise a small percentage, such as 1%, of all subframes and are reserved for open discovery. During the D2D discovery subframes, only discovery signals are transmitted and there is usually no cellular communications.

Figure 3:
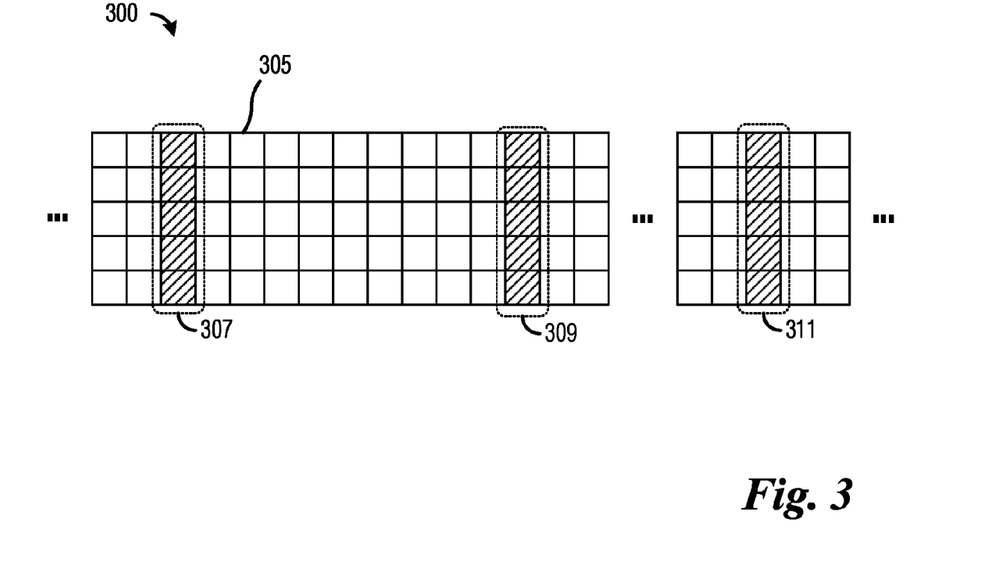
FIG. 3 illustrates an example plurality of subframes supporting D2D open discovery according to example embodiments described herein.

FIG. 3 illustrates an example plurality of subframes 300 supporting D2D open discovery. Each subframe of subframes 300, such as subframe 305, includes a plurality of communications system resources, such as resource elements (REs). The entirety of a subframe may be allocated for D2D open discovery, such as subframes 307, 309, and 311. Subframes allocated for D2D open discovery may be periodic in nature. As an illustrative example, every N-th subframe may be allocated for D2D open discovery, where N is an integer value, such as 1, 2, 3, 4, 5, 6, 7, 8, 9, and the like. It is noted that although the discussion focuses on the entirety of subframes being allocated for D2D open discovery, the example embodiments discussed herein are operable with portions of subframes being allocated for D2D open discovery. Additionally, the discussion mentions that that D2D open discovery subframes are periodic in nature. However, any subframe may be allocated for D2D open discovery as long as the UEs know the location of the subframe so that they can transmit discovery signals and listen for discovery signals of other UEs.

Figure 4:
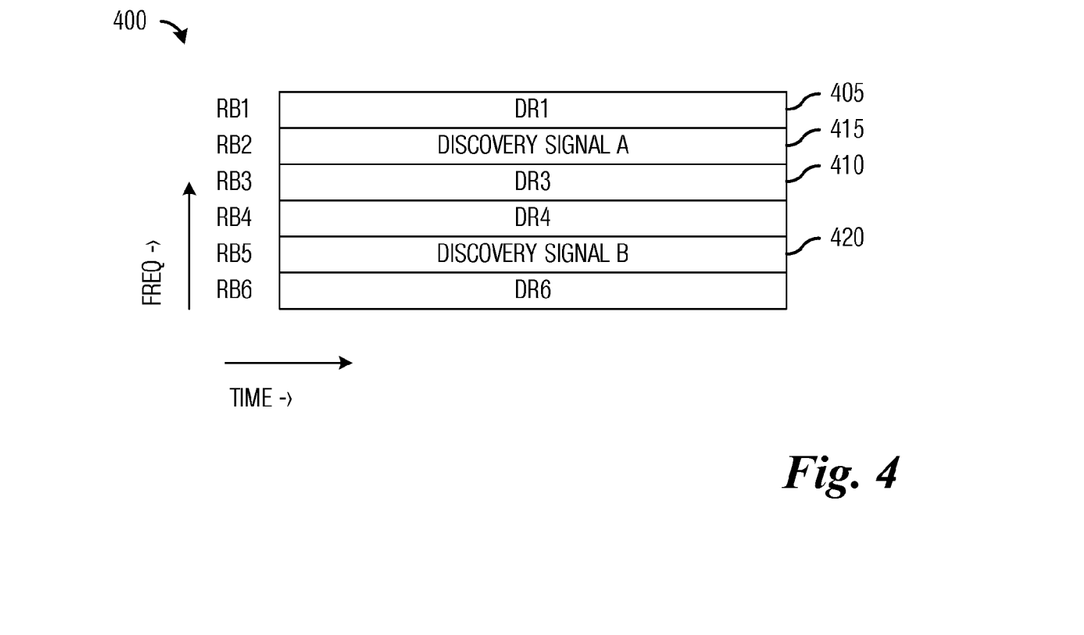
FIG. 4 illustrates an example subframe allocated for D2D open discovery according to example embodiments described herein.

FIG. 4 illustrates an example subframe 400 allocated for D2D open discovery. Subframe 400 includes a plurality of discovery resources (DR), such as DR1 405 and DR2 410. As shown in FIG. 4, subframe 400 includes 6 DRs, however, other subframe configurations may have different numbers of DRs. Each DR may comprise a set of REs within the subframe. As an example, a DR may be an entire physical resource block (PRB) pair. As another example, a DR may be a subset of a PRB pair. As yet another example, a DR may be multiple PRB pairs. As shown in FIG. 4, 2 DRs of subframe 400 are occupied by discovery signals of UEs, with DR2 415 being occupied by discovery signal A and DR5 420 being occupied by discovery signal B.

If there are not enough DRs allocated for the open discovery process with respect to the number of UEs participating in the open discovery process, the open discovery process will be inefficient. As an example, there will be a lot of collisions between discovery signals transmitted by the UEs, thereby resulting in many UEs not being discovered. On the other hand, if the number of DRs allocated is very large for the open discovery process with respect to the number of UEs participating in the open discovery process, there will be a small number of collisions. However, many DRs will be unoccupied, resulting in excessive communications overhead and reduced communications capacity.

Figure 5:
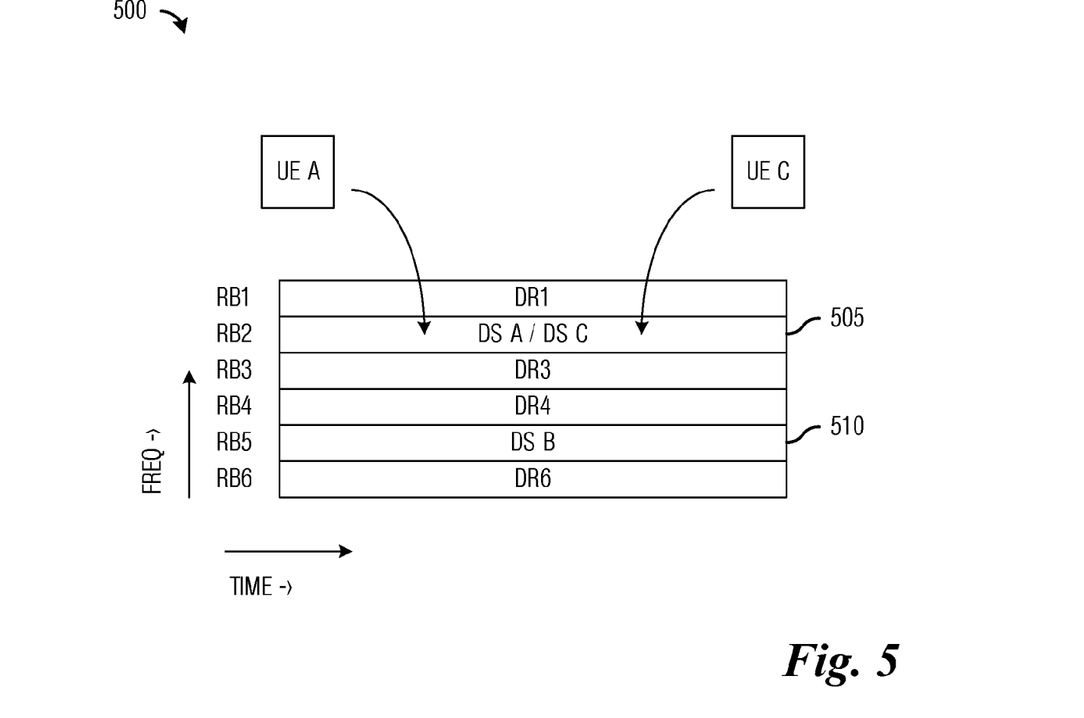
FIG. 5 illustrates an example subframe allocated for D2D open discovery, highlighting a discovery collision according to example embodiments described herein.

FIG. 5 illustrates an example subframe 500 allocated for D2D open discovery, highlighting a discovery collision. Subframe 500 illustrates a discovery signal collision in DR 505 with discovery signals DS A (e.g., transmitted by UE A) and DS C (e.g., transmitted by UE C). The discovery signal collision in DR 505 will likely result in other UEs being unable to detect neither of the two discovery signal and consequently, neither of the two UEs. However, discovery signal DS B is successfully transmitted without collision in DR 510.

According to an example embodiment, UE-triggered and/or eNB-triggered techniques are provided to help an eNB adjust a number of resources (i.e., DRs) allocated for open discovery based on resource occupancy. In other words, the eNB is able to adjust the number of DRs allocated for open discovery based on a metric that measures utilization of the DRs.

According to an example embodiment, a UE is configured to trigger the reporting of metric values that measure utilization of DRs. The eNB typically does not have to actively participate in UE-triggered operation. However, the eNB may be configured to provide the UE with information, such as thresholds, information about resources allocated for D2D discovery, and the like.

Figure 6:
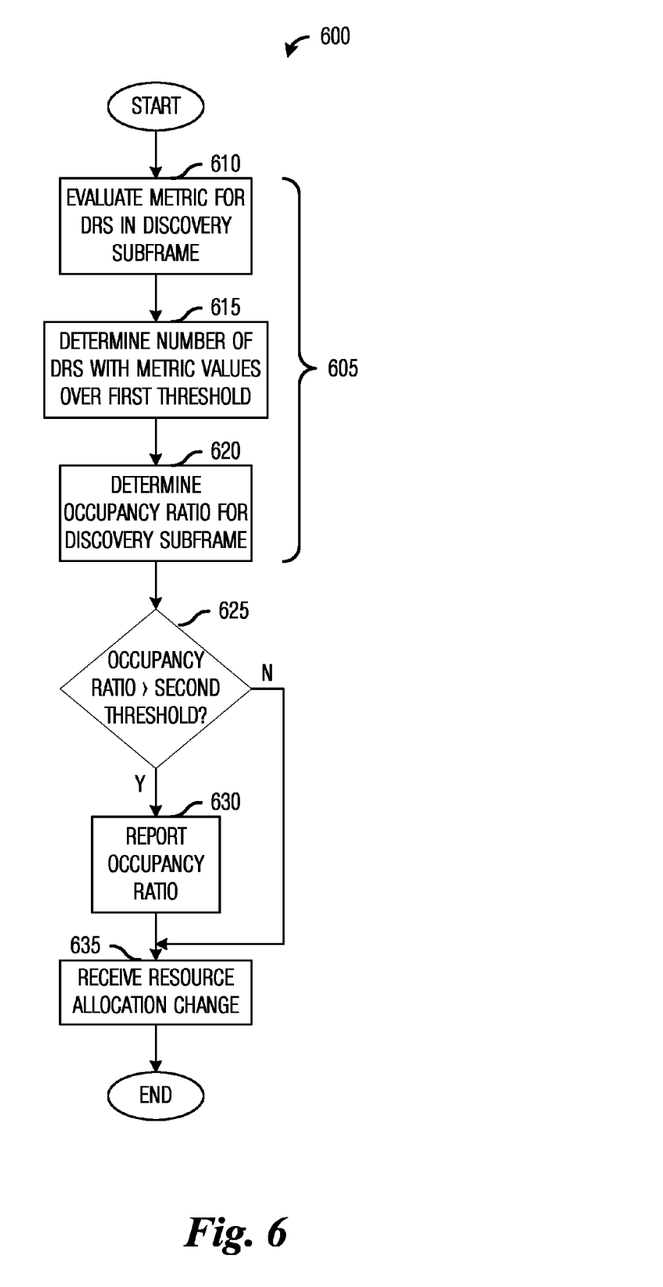
FIG. 6 illustrates a flow diagram of example operations occurring in a UE as the UE participates in a UE-triggered DR allocation process according to example embodiments described herein.

FIG. 6 illustrates a flow diagram of example operations 600 occurring in a UE as the UE participates in a UE-triggered DR allocation process. Operations 600 may be indicative of operations occurring in a UE, such as UE no, UE 112, UE 114, UE 116, UE 120, and the like, as the UE participated in a UE-triggered DR allocation process.

Operations 600 may begin with the UE determining a utilization measure for a discovery subframe (blocks 605). The utilization measure may provide a representation of how many devices are transmitting in the discovery subframe and therefore, the utilization of the discovery subframe. The utilization measure may also provide a likelihood estimate for a successful decoding of discovery signals transmitted in the discovery subframe. As an illustrative example, a discovery subframe with a high utilization measure may have a large number of devices transmitting in the discovery subframe, therefore a low likelihood that discovery signals transmitted in the discovery subframe will be successfully decoded. Similarly, a discovery subframe with a low utilization measure may have a small number of devices transmitting in the discovery subframe, therefore a high likelihood that discovery signals transmitted in the discovery subframe will be successfully decoded.

An example implementation of the UE determining the utilization measure for a discovery subframe (blocks 605) is as follows:

1. The UE may evaluate a metric for each DR in the discovery subframe (block 610). Evaluating the metric for a DR may result in a measured value for the DR. The measured values may be numerical numbers that may be representative of a number of devices (e.g., D2D devices, non-D2D devices, and the like) transmitting in the DRs of the discovery subframe. The UE may be able to detect transmissions from devices in each DR. As an example, one or more other D2D devices may be transmitting a discovery signal in a DR, while a non-D2D device may be making a transmission (uplink or downlink) in the DR.

As an illustrative example, the metric may be a signal to interference plus noise ratio (SINR) and the measured value is a SINR value. In general, a high SINR value for a DR may indicate that there are relatively few devices transmitting in the DR. While a DR with a low SINR value may indicate that there are relatively many devices transmitting in the DR. The measured value, and potentially in conjunction with received energy or power, may allow the UE to determine information about the DRs. Another example metric may be success and/or failure in discovery signal decoding. Table 1 illustrates occupation information about DRs as a function of SINR value (or similarly decoding success and/or failure) and received energy (or power).

TABLE 1

DR occupation information as a function of SINR (or decoding success and/or failure) and received energy (or power).

| | | SINR/successful decoding of discovery signal | |
|---|---|---|---|
| | | Low/Bad | High/Good |
| DR received Energy or Power | Low | Unoccupied DR | Occupied by distant UE (no collision) |
| | High | Occupied by multiple UEs (collision) | Occupied by proximate UE (possible collision) |

As shown in Table 1, in a situation where the SINR value of a DR is high (or with successful decoding of a discovery signal) and the received energy is low, the DR is likely to contain no transmissions or transmissions from distant devices so no collision is expected. However, in a situation where the SINR value of a DR is high (or with successful decoding of a discovery signal) and the received energy is high, the DR is likely to contain transmissions from a proximate device and collisions are possible. In another situation where the SINR value of a DR is low (or with unsuccessful decoding of a discovery signal) and the received energy is low, the DR is unlikely to be occupied so no collision is expected. But, in a situation where the SINR value of a DR is low (or with unsuccessful decoding of a discovery signal) and the received energy is high, the DR does contain transmissions from multiple devices so collisions will most likely occur.

Although the discussion presented herein focuses on DRs in a discovery subframe, the example embodiments are operable with other configurations. As an example, the DRs may be part of a set of discovery subframes, a radioframe, a fraction of a communications system bandwidth. Therefore, the discussion of DRs of a discovery subframe should not be construed as being limiting to either the scope or the spirit of the example embodiments.

2. The UE may determine a number of DRs with measured values exceeding a first threshold (block 615). According to an example embodiment, the first threshold may provide a representation of what is to be considered a high utilization of a DR. As an illustrative example, if the first threshold is set to a relatively small value, then DRs containing transmissions from a small number of devices may be considered to be having a high level of utilization, while if the threshold is set to a relatively large value, then only DRs containing transmissions from a large number of devices may be considered to be having a high level of utilization. The UE may simply compare the measured value from each DR in the discovery subframe against the first threshold and increment a counter whenever it finds a measured value that exceeds the first threshold.

3. The UE may determine an occupancy ratio for the discovery subframe (block 620). The occupancy ratio may be representative of the number of DRs with measures exceeding the threshold to a total number of DRs in the discovery subframe. In other words, the occupancy ratio may be representative of a fraction of DRs in the discovery subframe that have high utilization. The occupancy ratio may be the utilization measure.

The UE may report the utilization measure (occupancy ratio in the example presented previously) to an eNB (block 630). The UE may report the utilization measure using a physical layer message. The UE may report the utilization measure using higher layer signaling. In general, the UE may report the utilization measure when a reporting criterion is met. If the UE is to report the utilization measure without any restrictions, the reporting criterion may be always true. The UE may receive information about changes in the number of DRs allocated for D2D discovery (block 635). Additionally, if the location of the DRs has also changed, the UE may receive information about the new location of the DRs.

However, to help reduce communications overhead, the UE may compare the utilization measure with a second threshold (block 625). If the utilization measure exceeds the second threshold, the UE will report the utilization measure to the eNB (block 630). If the utilization measure does not exceed the second threshold, the UE will not report the utilization measure. In such a situation, the reporting criterion may be the utilization measure exceeding the second threshold. According to another example embodiment, in order to help reduce communications overhead, the UE may be configured to report an average of a plurality of utilization measures, such as through the use of a sliding window of discovery subframes. The size of the sliding window may be provided by a technical standard, operator of the communications system, and the like. In such a situation, the reporting criterion may be that the UE has generated an averaged utilization measure according to the sliding window. According to another example embodiment, in order to help reduce communications overhead, the UE may be configured to report the utilization measure if there is sufficient change in consecutive utilization measures. In such a situation, the reporting criterion may be there being sufficient change in consecutive utilization measures.

According to an example embodiment, the first threshold and the second threshold may be specified in a technical standard, such as the 3GPP LTE standards, broadcasted to the UE, sent to the UE in a system information block (SIB), sent by higher layer signaling, and the like. According to another example embodiment, the first threshold and/or the second threshold may be consistent for all UE. The first threshold and/or the second threshold may differ for different UEs. As an illustrative example, some higher classes of UE with interference cancelling capability may be able to detect a discovery signal at a lower SINR value than lower class UEs without the interference cancelling capability. Consequently, such a UE may benefit from a lower first threshold.

According to another example embodiment, a situation where too many UEs are reporting utilization measures is avoided by having only a subset of UEs be allowed to report. As an illustrative example, connected UEs, UEs having a specified identification number substring, and the like, may be allowed to report. Alternatively, the eNB may specifically notify some UEs that they are allowed to report utilization measures. In such a situation, UEs not explicitly indicated that they are allowed to report would not send utilization measures.

According to another example embodiment, metrics other than occupation ratio are used. Examples of other metrics include number of discovery signals per discovery subframe, and the like.

According to an example embodiment, an eNB is configured to trigger the reporting of metric values that measure utilization of DRs. In eNB-triggered operation, both the eNB and the UE actively participate.

Figure 7A:
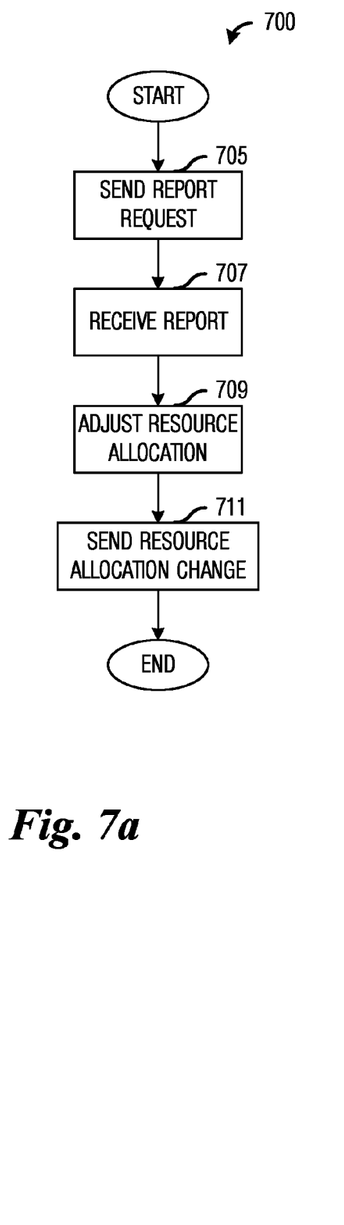
FIG. 7a illustrates a flow diagram of example operations occurring in an eNB as the eNB participates in an eNB-triggered DR allocation process according to example embodiments described herein.

FIG. 7a illustrates a flow diagram of example operations 700 occurring in an eNB as the eNB participates in an eNB-triggered DR allocation process. Operations 700 may be indicative of operations occurring in an eNB, such as eNB 105, as the eNB participates in an eNB-triggered DR allocation process.

Operations 700 may begin with the eNB sending a report request to the UE (block 705). According to an example, the report request may be a single report type request (i.e., an aperiodic request) where the eNB expects the UE to report the utilization measure after it receives the report request. According to another example embodiment, the report request may be a multiple report type request where the eNB specifies a report period, a report time duration, and the like, for the UE. The eNB may expect the UE to report multiple utilization measures in accordance with the report period, report time duration, and the like, specified in the report request. According to yet another alternative embodiment, the report period, the report time duration, and the like, may be specified by a technical standard or an operator of the communications system. The report request may be unicast to the UE on a physical layer control channel such as a common physical downlink control channel (PDCCH) or an enhanced PDCCH (EPDCCH), multicast if the report request is intended for more than one UE, or broadcast in specific message on a PDCCH or an EPDCCH. In a multicast or broadcast report request, the UEs may be specified by UE type, radio network temporary identifier (RNTI) value, UE identifier, and the like).

According to an example embodiment, in order to help provide tolerance to transient type behavior, the report request specifies a sliding window size over which the UE is to average several utilization measures. The report request message may also include thresholds, such as the first threshold and/or the second threshold discussed previously.

The eNB may receive the utilization measure report from the UE (block 707). The utilization measure report may be received as a physical layer message or a higher layer message. According to an example embodiment, although the UE is expected to report the utilization measure (per the report request), the UE may help to reduce communications overhead by not reporting the utilization measure if it has not changed from a previously reported utilization measure or if it has changed, but the change is smaller than a specified threshold. In such a situation, the eNB may use the previously reported utilization measure until it receives a newly reported utilization measure from the UE. The eNB may adjust the allocation of the DRs if an adjustment condition is met (block 709). In other words, the eNB may adjust the allocation of the DRs in accordance with the utilization measure report. As an illustrative example, if the utilization measure report indicates that the DRs are being underutilized, the eNB may reduce the number of DRs. Similarly, if the utilization measure report indicates that the DRs are being over utilized, the eNB may increase the number of DRs. As an illustrative example, if the utilization measure indicates that the DRs are being underutilized even after the eNB has reduced the number of DRs, the eNB may further reduce the number of DRs. As another illustrative example, if the utilization measure indicates that the DRs are being over utilized after a previously reported utilization measure indicating that the DRs are being underutilized (and the eNB reducing the number of DRs), the eNB may elect to wait for another utilization measure before adjusting the allocation of DRs to help prevent a ping-pong condition from occurring by increasing the number of DRs immediately after decreasing the number of DRs. The eNB may send information about changes in the allocation of DRs to the UE (block 711). Additionally, if the eNB changed location of the DRs allocated for D2D discovery, the eNB may send information about the location of the DRs to the UE.

Figure 7B:
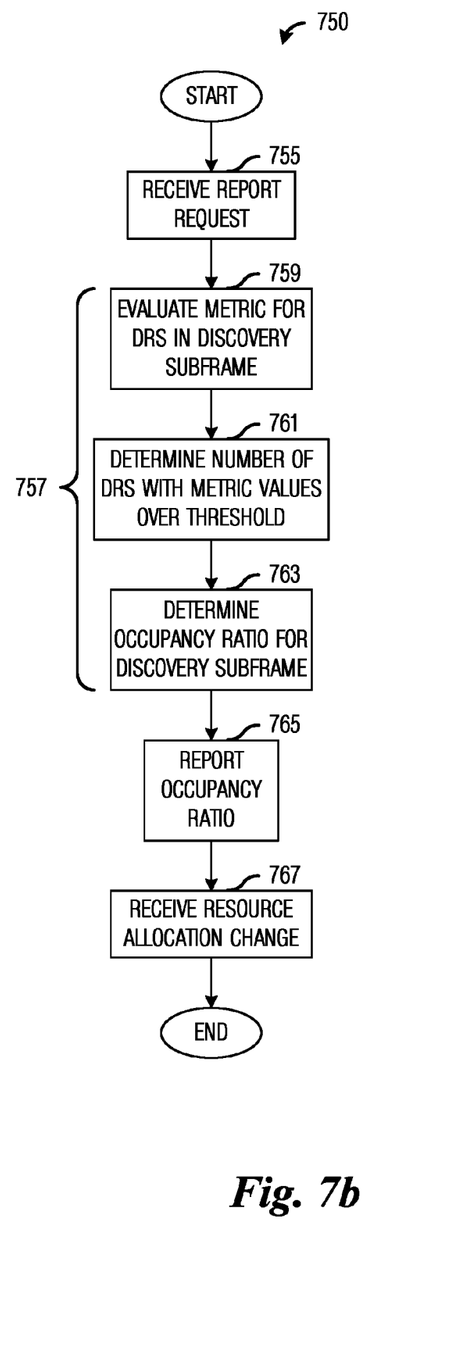
FIG. 7b illustrates a flow diagram of example operations occurring in a UE as the UE participates in an eNB-triggered DR allocation process according to example embodiments described herein.

FIG. 7b illustrates a flow diagram of example operations 750 occurring in a UE as the UE participates in an eNB-triggered DR allocation process. Operations 750 may be indicative of operations occurring in a UE, such as UE 110, UE 112, UE 114, UE 116, UE 120, and the like, as the UE participated in an eNB-triggered DR allocation process.

Operations 750 may begin with the UE receiving a report request from the eNB (block 755). The report request may be a single report type request (i.e., an aperiodic request) specifying that the UE measure and report a utilization measure for DRs. Alternatively, the report request may be a multiple report type request specifying a report period, a report time duration, and the like, for the UE to measure and report multiple utilization measures for DRs.

The UE may determine a utilization measure for a discovery subframe (blocks 757). An example implementation of the UE determining the utilization measure for the discovery subframe may include the UE evaluating a metric for each DR in the discovery subframe (block 759), determining a number of DRs with measured values exceeding a first threshold (block 761), and determining an occupancy ratio for the discovery subframe (block 763).

When a reporting criterion is met (e.g., receiving the report request, expiration of a reporting period timer, and the like), the UE may report the utilization measure to the eNB (block 765). The UE may receive information about changes in the number of DRs allocated for D2D discovery (block 767). Additionally, if the location of the DRs has also changed, the UE may receive information about the new location of the DRs.

According to an example embodiment, both UE-triggered reporting and eNB-triggered report are used. The UE-triggered reporting and the eNB-triggered reporting may use the same or different parameters, such as thresholds, reporting UEs, and the like. As an illustrative example, eNB-triggered reporting may be used by specifying that UEs report at a specified period and UE-triggered reporting may be employed to help detect unexpected changes in operating conditions. As an alternate illustrative example, eNB-triggered reporting may be used by specifying a class or group of UEs to report at a specified period and UE-triggered reporting may be employed to have any UE report changes in operating condition.

According to an example embodiment, both UE-triggered reporting and eNB-triggered report are used. The reporting parameters are sent to the UEs in a SIB message, with the same SIB message also indicating discovery subframe configuration. The threshold may be set to be a number of discovered D2D devices instead of SINR value. Furthermore, the reporting may be performed by all connected UEs. Generally, the reporting is aperiodic since the reporting does not need to be sent very often. If there are not a sufficient number of connected UEs, the eNB may wake up some sleeping UEs. Furthermore, since UE distribution is not uniform but may include some hotspots (such as airports, train depots, shopping centers, and the like), the eNB may configure different discovery subframes for different locations. UE-triggered reporting is usually employed when a UE experiences an unacceptable number of discovery collisions.

Figure 8:
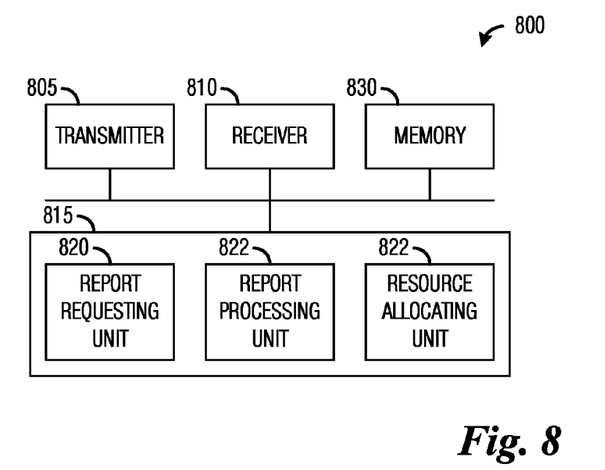
FIG. 8 illustrates an example first communications device according to example embodiments described herein.

FIG. 8 illustrates an example first communications device 800. Communications device 800 may be an implementation of a communications controller, such as an eNB, a base station, a NodeB, a controller, and the like. Communications device 800 may be used to implement various ones of the embodiments discussed herein. As shown in FIG. 8, a transmitter 805 is configured to transmit frames, report requests, discovery subframe information, and the like. Communications device 800 also includes a receiver 810 that is configured to receive frames, utilization measure reports, and the like.

A report requesting unit 830 is configured to generate report requests. Report requesting unit 830 is configured to generate single report type requests (i.e., an aperiodic request). Report requesting unit 830 is configured to generate multiple report type requests. Report processing unit 830 is configured to select UEs to receive the report requests. Report processing unit 830 is configured to specify parameters for the reports. A report processing unit 822 is configured to process received utilization measure reports. Report processing unit 822 is configured to determine if an adjustment condition is met. A resource allocating unit 824 is configured to allocate resources for D2D discovery. Resource allocating unit 824 is configured to adjust an allocation of resources for D2D discovery in accordance with the utilization measure reports. A memory 830 is configured to store report requests, parameters for the reports, information about selected UEs, utilization measure reports, information about resources allocated for D2D discovery, thresholds, and the like.

The elements of communications device 800 may be implemented as specific hardware logic blocks. In an alternative, the elements of communications device 800 may be implemented as software executing in a processor, controller, application specific integrated circuit, or so on. In yet another alternative, the elements of communications device 800 may be implemented as a combination of software and/or hardware.

As an example, receiver 810 and transmitter 805 may be implemented as a specific hardware block, while report requesting unit 820, report processing unit 822, and resource allocating unit 824 may be software modules executing in a microprocessor (such as processor 815) or a custom circuit or a custom compiled logic array of a field programmable logic array. Report requesting unit 820, report processing unit 822, and resource allocating unit 824 may be modules stored in memory 830.

Figure 9:
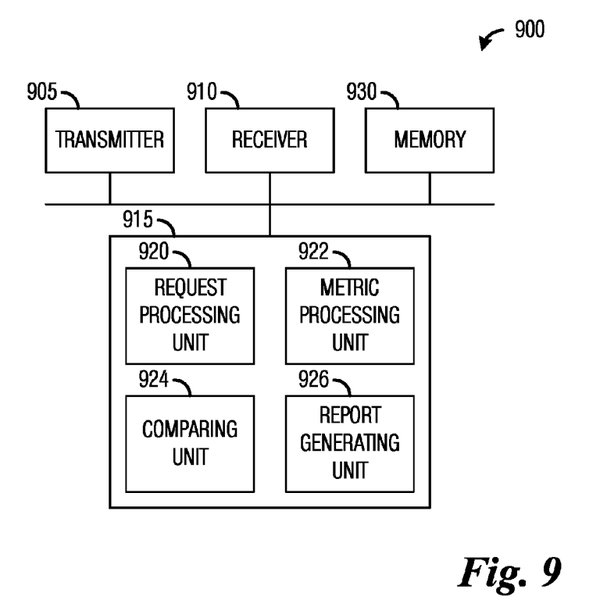
FIG. 9 illustrates an example second communications device according to example embodiments described herein.

FIG. 9 illustrates an example second communications device 900. Communications device 900 may be an implementation of a D2D device, such as a UE, a user, a subscriber, a terminal, a mobile, a mobile station, and the like. Communications device 900 may be used to implement various ones of the embodiments discussed herein. As shown in FIG. 9, a transmitter 905 is configured to transmit frames, utilization measure reports, and the like. Communications device 900 also includes a receiver 910 that is configured to receive frames, report requests, discovery subframe information, and the like.

A request processing unit 920 is configured to process received report requests. Request processing unit 920 is configured to determine a nature of the received report requests (e.g., single report type requests or multiple report type requests) and configure communications device 900 accordingly. A metric processing unit 922 is configured to process measurements of signals in resources allocated for D2D discovery, such as DRs in discovery subframes, to generate utilization measures for the resources. A comparing unit 924 is configured to compare values, such as measured values, utilization measures, and the like, with thresholds. Comparing unit 924 is configured to determine if the values meet the thresholds. A report generating unit 926 is configured to generate reports in accordance with the utilization measures and the report requests. Report generating unit 926 is configured to average multiple utilization measures and/or measured values using a sliding window. Report generating unit 926 is configured to determine if the utilization measures meet a difference threshold used to help reduce communications overhead by reducing reports. Report generating unit 926 is configured to generate report messages. A memory 930 is configured to store report requests, parameters for the reports, utilization measures, measured values, utilization measure reports, information about resources allocated for D2D discovery, thresholds, and the like.

The elements of communications device 900 may be implemented as specific hardware logic blocks. In an alternative, the elements of communications device 900 may be implemented as software executing in a processor, controller, application specific integrated circuit, or so on. In yet another alternative, the elements of communications device 900 may be implemented as a combination of software and/or hardware.

As an example, receiver 910 and transmitter 905 may be implemented as a specific hardware block, while request processing unit 920, metric processing unit 922, comparing unit 924, and report generating unit 926 may be software modules executing in a microprocessor (such as processor 915) or a custom circuit or a custom compiled logic array of a field programmable logic array. Request processing unit 920, metric processing unit 922, comparing unit 924, and report generating unit 926 may be modules stored in memory 930.

Although the present disclosure and its advantages have been described in detail, it should be understood that various changes, substitutions and alterations can be made herein without departing from the spirit and scope of the disclosure as defined by the appended claims.

What is claimed is:

1. A method for operating a mobile device, the method comprising:
   determining, by the mobile device, a utilization measure for resources in a communications system, wherein determining the utilization measure comprises:
      determining a signal to interference plus noise ratio (SINR) value for each of the resources;
      determining a number of resources with SINR values meeting a SINR threshold; and
      deriving the utilization measure in accordance with the number of resources with SINR values meeting the SINR threshold, and the number of resources, wherein each of the resources comprises a set of resource elements (REs), and wherein the resources are located in a set of subframes;
   comparing, by the mobile device, the utilization measure to a utilization threshold;
   determining, by the mobile device, that a reporting criterion is satisfied in response to the utilization measure exceeding the utilization threshold; and
   sending, by the mobile device, a utilization measure report to an evolved NodeB (eNB) in response to the reporting criterion being satisfied, wherein the utilization measure report is configured to prompt an adjustment to a number of resources when an adjustment condition is met.

2. The method of claim 1, wherein the resources form one of a discovery subframe, a plurality of discovery subframes, a radioframe, or a subset of communications system bandwidth.

3. The method of claim 1, wherein deriving the utilization measure comprises dividing the number of resources with SINR values meeting the SINR threshold by the number of resources.

4. The method of claim 1, further comprising averaging the utilization measure with N previously derived utilization measures, where N is an integer value representing a size of a sliding window.

5. The method of claim 1, wherein determining the utilization measure comprises:
   attempting to decode discovery signals in the resources;
   determining a number of successfully decoded discovery signals; and
   deriving the utilization measure in accordance with the number of successfully decoded discovery signals and the number of resources.

6. The method of claim 1, wherein determining the utilization measure comprises:
   determining a number of successfully decoded discovery signals in the resources;
   determining one of received energy levels or received power levels for the resources; and
   deriving the utilization measure in accordance with the number of successfully decoded discovery signals and the one of the received energy levels or the received power levels.

7. The method of claim 1, wherein the utilization threshold is received from the eNB.

8. The method of claim 7, wherein the utilization threshold is received using higher layer signaling.

9. The method of claim 7, wherein the utilization threshold is received in a system information block (SIB).

10. The method of claim 1, further comprising deriving the utilization measure in accordance with a success and/or failure in signal decoding.

11. A method for operating an evolved NodeB (eNB), the method comprising:
    sending, by the eNB to a mobile device, a utilization threshold indicating a level of utilization of resources at which the mobile device should send a utilization report;
    receiving, by the eNB, the utilization report from the mobile device, the utilization report corresponding to a utilization measure for the resources indicating the utilization measure meets the utilization threshold, the utilization measure derived in accordance with a number of resources with signal to interference plus noise ratio (SINR) values meeting an SINR threshold, and the number of resources, wherein each of the resources comprises a set of resource elements (REs), and wherein the resources are located in a set of subframes; and adjusting, by the eNB, a number of resources in accordance with the utilization report.

12. The method of claim 11, wherein the utilization measure is a ratio of a number of resources with an SINR value exceeding a SINR threshold to the number of resources.

13. The method of claim 11, further comprising sending the utilization threshold to the mobile device using higher layer signaling.

14. The method of claim 11, further comprising sending the utilization threshold to the mobile device in a system information block (SIB).

15. The method of claim 11, wherein the utilization measure is further derived in accordance with a success and/or failure in signal decoding by the mobile device.

16. A mobile device comprising:
a processor configured to:
determine a utilization measure for resources in a communications system, wherein the processor configured to determine the utilization measure comprises the processor configured to:
determine a signal to interference plus noise ratio (SINR) value for each of the resources;
determine a number of resources with SINR values meeting a SINR threshold; and
derive the utilization measure in accordance with the number of resources with SINR values meeting the SINR threshold, and the number of resources, wherein each of the resources comprises a set of resource elements (REs), and wherein the resources are located in a set of subframes;
compare the utilization measure to a utilization threshold; and
determine that a reporting criterion is satisfied in response to the utilization measure exceeding the utilization threshold; and
a transmitter operatively coupled to the transmitter, the processor configured to send a utilization measure report to an evolved NodeB (eNB) in response to the reporting criterion being satisfied, wherein the utilization measure report is configured to prompt an adjustment to a number of resources when an adjustment condition is met.

17. The mobile device of claim 16, wherein the processor is configured to divide the number of resources with SINR values meeting the SINR threshold by the number resources.

18. The mobile device of claim 16, wherein the utilization threshold is received from the eNB.

19. The mobile device of claim 18, wherein the utilization threshold is received from the eNB using higher layer signaling.

20. The mobile device of claim 18, wherein the utilization threshold is received from the eNB in a system information block (SIB).

21. The mobile device of claim 16, wherein the processor configured to derive the utilization measure further comprises the processor configured to derive the utilization measure in accordance with a success and/or failure in signal decoding.

22. The mobile device of claim 16, wherein the processor is configured to attempt to decode discovery signals in the resources, to determine a number of successfully decoded discovery signals, and to derive the utilization measure in accordance with the number of successfully decoded discovery signals and the number of resources.

23. The mobile device of claim 16, wherein the processor is configured to determine a number of successfully decoded discovery signals in the resources, to determine one of received energy levels or received power levels for the resources, and to derive the utilization measure in accordance with the number of successfully decoded discovery signals and the one of the received energy levels or the received power levels.

24. The mobile device of claim 16, wherein the resources form one of a discovery subframe, a plurality of discovery subframes, a radioframe, or a subset of communications system bandwidth.

25. The mobile device of claim 16, wherein the processor configured to derive the utilization measure comprises the processor configured to divide the number of resources with SINR values meeting the SINR threshold by the number of resources.

26. An evolved NodeB (eNB) comprising:
a transmitter configured to send to a mobile device, a utilization threshold indicating a level of utilization of resources at which the mobile device should send a utilization report;
a receiver configured to receive the utilization report from the mobile device, the utilization report corresponding to a utilization measure for the resources indicating the utilization measure meets the utilization threshold, the utilization measure derived in accordance with a number of resources with signal to interference plus noise ratio (SINR) values meeting an SINR threshold, and the number of resources, wherein each of the resources comprises a set of resource elements (REs), and wherein the resources are located in a set of subframes; and
a processor operatively coupled to the receiver and the transmitter, the processor configured to adjust a number of resources in accordance with the utilization report.

27. The eNB of claim 26, further comprising the transmitter configured to send the utilization threshold to the mobile device in a system information block (SIB).

28. The eNB of claim 26, wherein the utilization measure is a ratio of a number of resources with an SINR value exceeding a SINR threshold to the number of resources.

29. The eNB of claim 26, further comprising the processor is configured to send the utilization threshold to the mobile device using higher layer signaling.

30. The eNB of claim 26, wherein the utilization measure is further derived in accordance with a success and/or failure in signal decoding by the mobile device.

* * * * *